(12) United States Patent
Vorberger et al.

(10) Patent No.: US 9,927,021 B1
(45) Date of Patent: Mar. 27, 2018

(54) PLANET CARRIER FOR A PLANETARY GEAR SET

(71) Applicant: ZF Friedrichshafen AG, Friedrichshafen (DE)

(72) Inventors: James Vorberger, Gray Court, SC (US); Anthony Ford, Gray Court, SC (US); Brandon Hawver, Gray Court, SC (US); Brian McIntyre, Gray Court, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/394,234

(22) Filed: Dec. 29, 2016

(51) Int. Cl.
*F16H 57/08* (2006.01)
*F16H 3/66* (2006.01)
*F16H 1/28* (2006.01)

(52) U.S. Cl.
CPC ......... *F16H 57/082* (2013.01); *F16H 1/2845* (2013.01); *F16H 3/66* (2013.01); *F16H 1/2809* (2013.01); *F16H 2057/085* (2013.01)

(58) Field of Classification Search
None
See application file for complete search history.

(56) References Cited

U.S. PATENT DOCUMENTS

| 4,222,290 | A | * | 9/1980 | Helmer | F16H 57/0427 475/159 |
|---|---|---|---|---|---|
| 5,310,391 | A | * | 5/1994 | Takahashi | F16H 1/2809 475/338 |
| 7,789,792 | B2 | | 9/2010 | Kamm et al. | |
| 8,398,522 | B2 | | 3/2013 | Bauknecht et al. | |
| 2007/0202986 | A1 | * | 8/2007 | Kotani | F16C 33/543 475/331 |
| 2014/0329636 | A1 | * | 11/2014 | Heuver | F16H 57/082 475/331 |
| 2015/0247566 | A1 | * | 9/2015 | McKinzie | F16H 57/0479 475/159 |
| 2015/0323057 | A1 | * | 11/2015 | Kim | F16H 57/0479 475/159 |
| 2015/0354694 | A1 | * | 12/2015 | Degenhart | B23P 15/14 475/331 |
| 2015/0377343 | A1 | * | 12/2015 | Fugel | F16C 19/30 475/159 |

* cited by examiner

*Primary Examiner* — Justin Holmes
(74) *Attorney, Agent, or Firm* — Dority & Manning, P.A.

(57) ABSTRACT

A planet carrier for a planetary gear set includes a pair of carrier plates. A planet gear is positioned between the carrier plates of the pair of carrier plates. A pin extends between the carrier plates of the pair of carrier plates through the planet gear such that the planet gear is rotatable relative to the carrier plates of the pair of carrier plates on the pin. A retainer is removably mounted to one of the pair of carrier plates. The pin is positioned against the retainer at the one of the pair of carrier plates. The pin may be rotatable relative to the carrier plates of the pair of carrier plates.

19 Claims, 6 Drawing Sheets

PLANET CARRIER FOR A PLANETARY GEAR SET

FIELD OF THE INVENTION

The present subject matter relates generally to planet carriers within planetary gear sets and automatic transmissions with planet carriers.

BACKGROUND OF THE INVENTION

Certain automatic transmissions include planetary gear sets. Components of the planetary gear sets are selectively coupled to each other or a casing of the automatic transmission to provide various gear ratios between an input shaft and an output shaft of the automatic transmission. The planetary gear set components can include a sun gear, a carrier and a ring gear. Planet gears may be mounted to the carrier with a pin.

Conventional mounting of the planet gears to the carrier has certain drawbacks. For example, the pin may be pressed or staked to the carrier by deforming a head of the pin in order to mount a plant gear on the pin to the carrier. However, a staked pin is not removable from the carrier without damaging or destroying the pin and/or carrier. As another example, a snap ring fixes the pin to the carrier such that the pin is not rotatable relative to the carrier, and a fixed pin can cause additional drag within the planetary gear set and negatively affect an efficiency of the planetary gear set.

Accordingly, a planet carrier for a planetary gear set that includes features for facilitating servicing of the planet carrier or planet gears would be useful. In addition, a planet carrier for a planetary gear set that includes features for operating with reduced drag relative to a planetary carrier with fixed pins would be useful.

BRIEF DESCRIPTION OF THE INVENTION

The present subject matter provides a planet carrier for a planetary gear set. The planet carrier includes a pair of carrier plates. A planet gear is positioned between the carrier plates of the pair of carrier plates. A pin extends between the carrier plates of the pair of carrier plates through the planet gear such that the planet gear is rotatable relative to the carrier plates of the pair of carrier plates on the pin. A retainer is removably mounted to one of the pair of carrier plates. The pin is positioned against the retainer at the one of the pair of carrier plates. The pin may be rotatable relative to the carrier plates of the pair of carrier plates. Additional aspects and advantages of the invention will be set forth in part in the following description, or may be apparent from the description, or may be learned through practice of the invention.

In a first exemplary embodiment, a planet carrier for a planetary gear set is provided. The planet carrier includes a first carrier plate defining an opening. A second carrier plate is spaced from the first carrier plate along an axial direction. The second carrier plate defines an opening. A planet gear is positioned between the first and second carrier plates along the axial direction. A pin extends between a first end portion and a second end portion along the axial direction. The first end portion of the pin is positioned against the first carrier plate at the opening of the first carrier plate. The second end portion of the pin is received within the opening of the second carrier plate. The pin extends through the planet gear between the first and second end portions of the pin such that the planet gear is rotatable relative to the first and second carrier plates on the pin. A retainer is removably mounted to the second carrier plate at the opening of the second carrier plate. The second end portion of the pin positioned at the retainer such that the pin is disposed between the retainer and the first carrier plate along the axial direction.

In a second exemplary embodiment, an automatic transmission is provided. The automatic transmission provides a plurality of planetary gears connected to provide multiple transmission ratios between an input shaft and an output shaft. At least one of the plurality of planetary gear sets has a planet carrier that includes a first carrier plate defining an opening. A second carrier plate also defines an opening. A planet gear is positioned between the first and second carrier plates along the axial direction. A pin extends between a first end portion and a second end portion along the axial direction. The first end portion of the pin is positioned against the first carrier plate at the opening of the first carrier plate. The second end portion of the pin is received within the opening of the second carrier plate. The pin extends through the planet gear between the first and second end portions of the pin such that the planet gear is rotatable relative to the first and second carrier plates on the pin. A retainer is removably mounted to the second carrier plate at the opening of the second carrier plate. The second end portion of the pin is positioned at the retainer such that the pin is disposed between the retainer and the first carrier plate along the axial direction.

In a third exemplary embodiment, a planet carrier for a planetary gear set is provided. The planet carrier includes a pair of carrier plates. A planet gear is positioned between the carrier plates of the pair of carrier plates. A pin extends between the carrier plates of the pair of carrier plates through the planet gear such that the planet gear is rotatable relative to the carrier plates of the pair of carrier plates on the pin. An elastically deformable retainer is removably mounted to one of the pair of carrier plates. The pin is positioned against the elastically deformable retainer at the one of the pair of carrier plates. The pin is rotatable relative to the carrier plates of the carrier plates.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
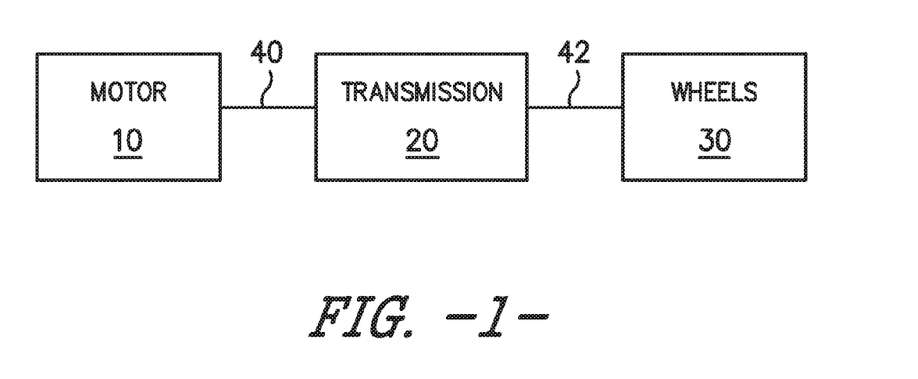
FIG. 1 provides a schematic view of certain components of a drive train according to an exemplary embodiment of the present subject matter.

FIG. 1 provides a schematic view of certain components of a drive train for a motor vehicle according to an exemplary embodiment of the present subject matter. The drive train shown in FIG. 1 is provided by way of example only. Thus, the present subject matter may be used in or with any other suitable drive train in alternative exemplary embodiments. As shown in FIG. 1, the drive train has a motor 10, such as an internal combustion engine and/or an electric motor. The drive train also includes an automatic transmission 20, wheels 30, an input shaft 40 and an output shaft 42. Input shaft 40 couples motor 10 and transmission 20 such that rotation of motor 10 is transferable to automatic transmission 20 via input shaft 40. Input shaft 40 may include a torque converter (not shown), e.g., when motor 10 is an internal combustion engine.

Automatic transmission 20 is disposed between input shaft 40 and output shaft 42 and is operable to adjust or change a transmission ratio between input shaft 40 and output shaft 42. Automatic transmission 20 may be any suitable type of automatic transmission. For example, automatic transmission 20 may be a hydraulic automatic transmission with planetary gear sets, such as a nine-speed automatic transmission as described in U.S. Pat. No. 8,398,522 to Bauknecht et al. or an eight-speed automatic transmission as described in U.S. Pat. No. 7,789,792 to Kamm et al., both of which are incorporated by reference in their entireties. Thus, automatic transmission 20 may be operable to provide multiple forward gear ratios, e.g., between input shaft 40 and output shaft 42, using the planetary gear sets within automatic transmission 20. As further examples, automatic transmission 20 may be a continuously variable transmission (CVT) or a dual clutch transmission (DCT). Thus, automatic transmission 20 may be operable to provide various forward gear ratios, e.g., between input shaft 40 and output shaft 42. As may be seen from the above, the term "automatic transmission" is used broadly herein, and the present subject matter may be used in or with any suitable automatic transmission. Still referring to FIG. 1, output shaft 42 is connected to wheels 30, e.g., via a suitable differential (not shown). Thus, automatic transmission 20 may transfer rotation from motor 10 to wheels 30 at a suitable speed to drive a vehicle associated with the drive strain of FIG. 1.

Figure 2:
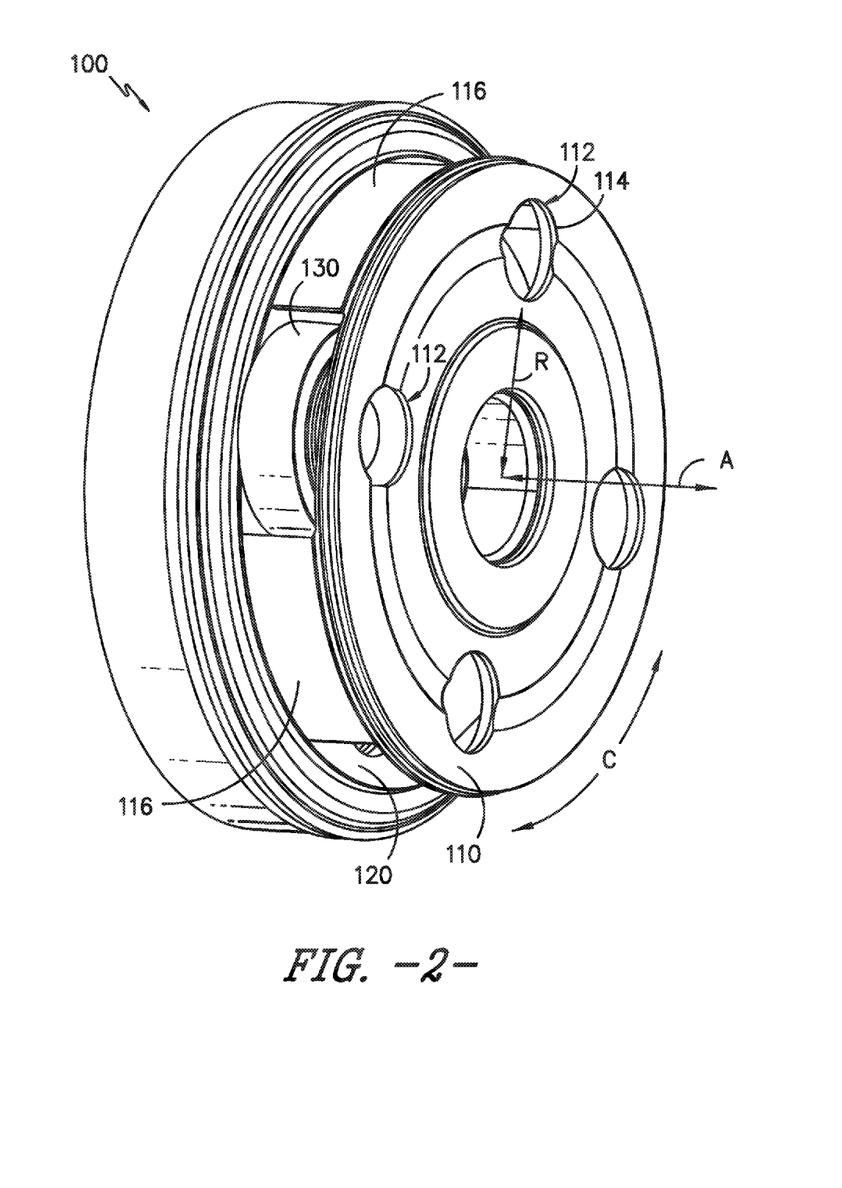
FIG. 2 provides a front, perspective view of a planet carrier according to an exemplary embodiment of the present subject matter.
Figure 3:
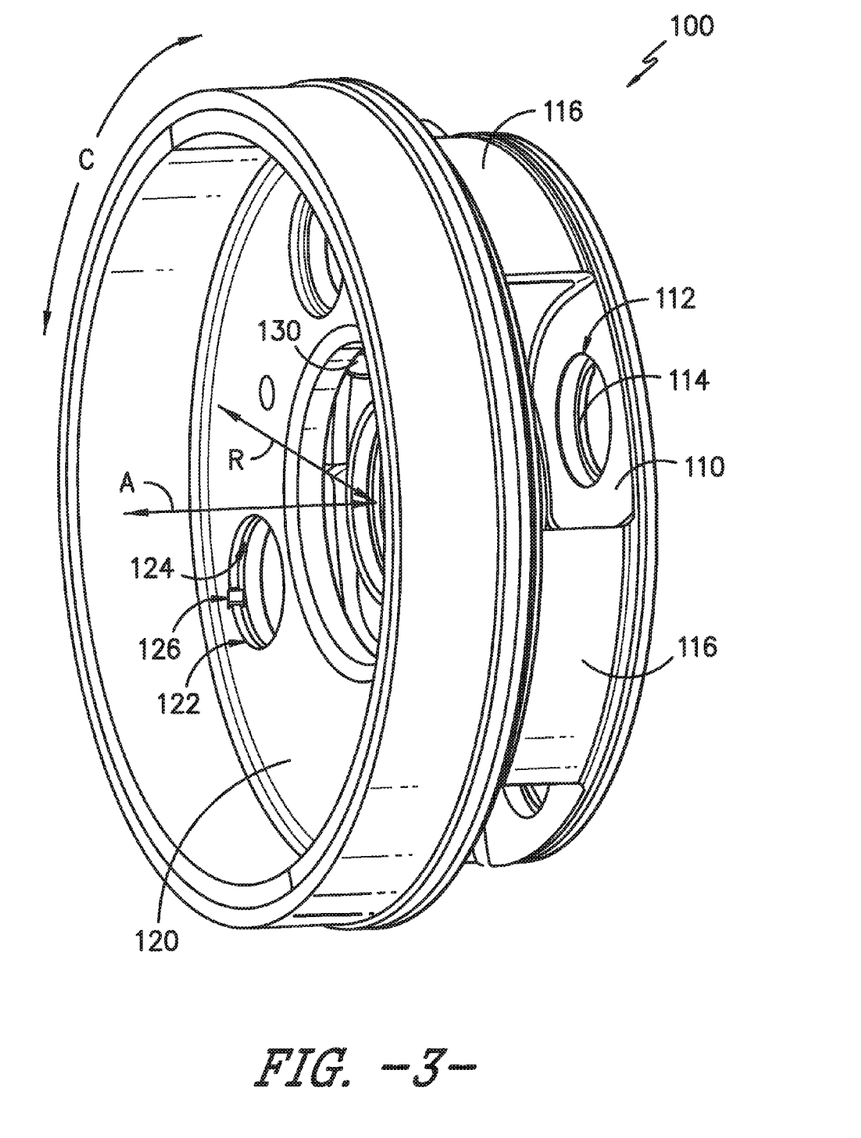
FIG. 3 provides a rear, perspective view of the exemplary planet carrier of FIG. 2.

FIG. 2 provides a front, perspective view of a planet carrier 100 according to an exemplary embodiment of the present subject matter. FIG. 3 provides a rear, perspective view of planet carrier 100. Planet carrier 100 may be used in or with any suitable planetary gear set, e.g., within an automatic transmission. For example, planet carrier 100 may be used in or with one of the planetary gear sets of automatic transmission 20 (FIG. 1). As discussed in greater detail below, planet carrier 100 includes features for assisting servicing of planet carrier 100 and/or for reducing drag within planet carrier 100.

As may be seen in FIGS. 2 and 3, planet carrier 100 includes a pair of carrier plates. For example, planet carrier 100 includes a first carrier plate 110 and a second carrier plate 120 that are spaced along an axial direction A. A planet gear 130 is positioned between first and second carrier plates 110, 120 along the axial direction A. First plate 110 may be mounted to second plate 120. For example, legs 116 of planet carrier 100 may extend from an end wall 114 of first plate 110 along the axial direction A to second plate 120. Distal ends of legs 116 may be welded or otherwise suitable mounted to second plate 120 to couple first plate 110 to second plate 120. It will be understood that in alternative exemplary embodiments, first and second carrier plates 110, 120 may be unitary with each other, such as when first and second carrier plates 110, 120 are cast and machined together.

Planet carrier 100 may include any suitable number of planet gears 130. Thus, while only one planet gear 130 is shown in FIGS. 2 and 3, planet carrier 100 may include and support two, three, four or more planet gears in alternative exemplary embodiments. In addition, while not shown in FIGS. 2 and 3, planet gear 130 may define teeth at an outer surface of planet gear 130, and the teeth of planet gear 130 may mesh with a sun gear and/or a ring gear of the associated planetary gear set.

Planet gear 130 is rotatable relative to first and second plates 110, 120. In particular, planet gear 130 is rotatable on a pin 140 between first and second plates 110, 120. First carrier plate 110 defines a bore or opening 112, and second carrier plate 120 also defines a bore or opening 122. Pin 140 may be mounted to first carrier plate 110 at opening 112 of first carrier plate 110 and may be mounted to second carrier plate 120 at opening 122 of second carrier plate 120. Pin 140 and mounting of pin 140 to first and second plate 110, 120 are discussed in greater detail below in the context of FIGS. 4 through 6.

Figure 4:
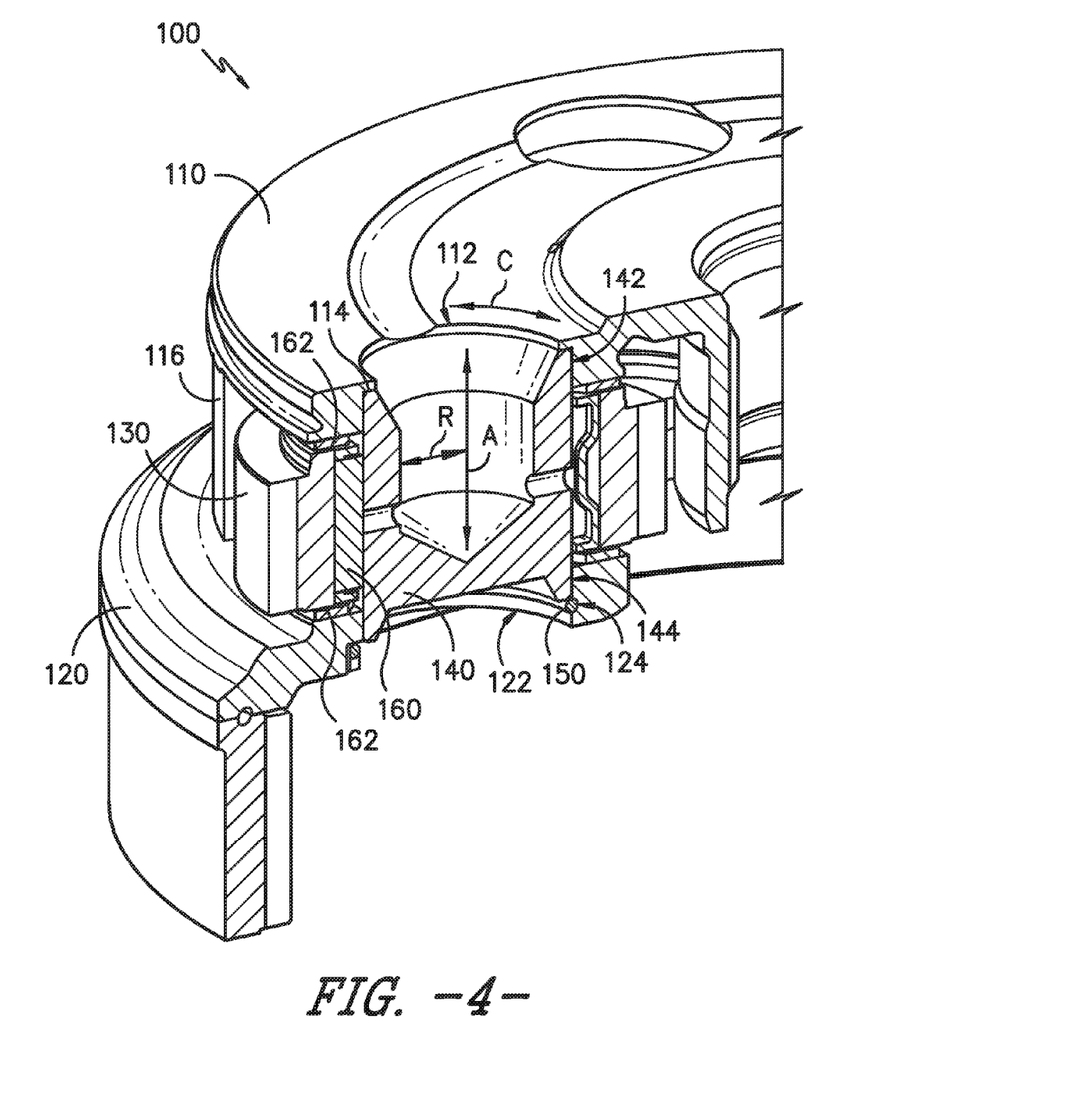
FIG. 4 provides a perspective partial, section view of the exemplary planet carrier of FIG. 2.
Figure 5:
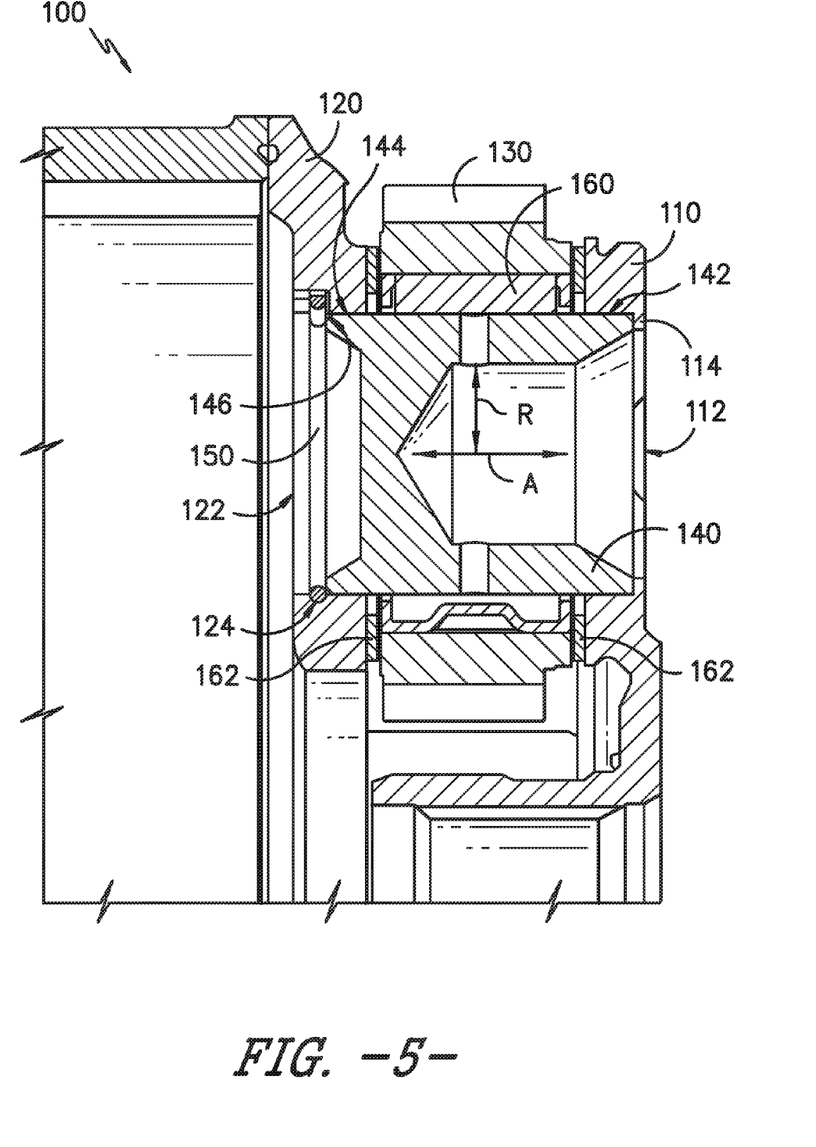
FIG. 5 provides a partial, section view of the exemplary planet carrier of FIG. 2.

FIG. 4 provides a perspective partial, section view of planet carrier 100. FIG. 5 provides a partial, section view of planet carrier 100. As may be seen in FIGS. 4 and 5, pin 140 extends between a first end portion 142 and a second end portion 144 along the axial direction A. First end portion 142 of pin 140 is positioned at or against first carrier plate 110. For example, first end portion 142 of pin 140 may be received within opening 112 of first carrier plate 110. Second end portion 144 of pin 140 is positioned at second carrier plate 120. For example, second end portion 144 of pin 140 may be received within opening 122 of second carrier plate 120. Thus, pin 140 may extend through planet gear 130 between first and second end portions 142, 144 of pin 140. In such a manner, pin 140 may mount planet gear 130 to first and second plates 110, 120 such that planet gear 130 is rotatable relative to first and second carrier plates 110, 120 on pin 140. An axis of rotation of planet gear 130 on pin 140 may be parallel to the axial direction A. Pin 140 may also couple planet gear 130 to first and second carrier plates 110, 120 such that planet gear 130 is removable from first and second carrier plates 110, 120, e.g., without damaging or destroying pin 140 and/or other components of carrier 100.

As may be seen in FIGS. 4 and 5, planet carrier 100 includes a retainer 150. Retainer 150 is removably mounted to or detachable from second carrier plate 120. For example, retainer 150 may be positioned within second carrier plate 120 at opening 122 of second carrier plate 120. Second end portion 144 of pin 140 may be positioned at or against retainer 150. Thus, pin 140 may be disposed between retainer 150 and first carrier plate 110, e.g., end wall 114 of first carrier plate 110, along the axial direction A. Retainer 150 and first carrier plate 110 may cooperatively limit axial travel or displacement of pin 140 in order to mount pin 140 to first and second carrier plates 110, 120. In alternative exemplary embodiments, planet carrier 100 may include an additional retainer (not shown) constructed or formed in the same or similar manner to retainer 150 at end wall 114 of first carrier plate 110, and retainer 150 and the additional retainer may cooperatively limit axial travel or displacement of pin 140 in order to mount pin 140 to first and second carrier plates 110, 120.

Because retainer 150 is removable mounted or detachable from second carrier plate 120, planet gear 130 and pin 140 may be removed or detached from first and second carrier plates 110, 120 by removing retainer 150 and then sliding pin 140 from opening 122 of second carrier plate 120 along the axial direction A. In such a manner, planet gear 130, pin 140 and other components of planet carrier 100 may be serviced more easily than planet carriers with staked pins.

Pin 140 may be rotatable relative to first and second carrier plates 110, 120. Thus, pin 140 may be supported on first and second carrier plates 110, 120 such that pin 140 is not fixed to first and second carrier plates 110, 120. Planet gear 130 on rotatable pin 140 may have less drag than planet gears mounted to bearings on fixed (e.g., staked) pins. To facilitate rotation of pin 140 relative to first and second carrier plates 110, 120, pin 140 may be a cylindrical or axially symmetrical pin, and opening 112 of first carrier plate 110 and opening 122 of second carrier plate 120 may be shaped complementary (e.g., cylindrical) to pin 140. In addition, retainer 150 may be spaced from end wall 114 of first carrier plate 110 by a space or gap along the axial direction A, and pin 140 may have a length along the axial direction A, e.g., between the first and second end portions 142, 144 of pin 140. The length of pin 140 may be less than the gap between retainer 150 and end wall 114 of first carrier plate 110, e.g., such that pin 140 is not compressed between retainer 150 and end wall 114 of first carrier plate 110. As a particular example, the length of pin 140 may be about twelve hundredths of an inch less than the gap between retainer 150 and end wall 114 of first carrier plate 110. As used herein, the term "about" means within twenty-five percent of the stated value when used in the context of lengths. In addition, an outer diameter of pin 140 may be less than an outer diameter of opening 112 of first carrier plate 110 and opening 122 of second carrier plate 120. Such shaping and/or sizing of pin 140 may facilitate rotation of pin 140 relative to first and second carrier plates 110, 120 and thereby reduce drag of planetary gear 130 relative to planet gears mounted to bearings on fixed (e.g., staked) pins.

Second carrier plate 120 may define a groove 124 at opening 122 of second carrier plate 120. For example, groove 124 may extend outwardly along a radial direction R from opening 122 of second carrier plate 120. Groove 124 may extend along a circumferential direction C around opening 122 of second carrier plate 120. Retainer 150 may be received within groove 124 of second carrier plate 120. For example, retainer 150 may be elastically deformed in order to reduce an outer diameter of retainer 150, and retainer 150 may then be inserted into groove 124 of second carrier plate 120 where retainer 150 may expand as constrained by groove 124. With retainer 150 positioned within groove 124, the interface between retainer 150 and second carrier plate 120 at groove 124 may limit or prevent movement of retainer 150 from groove 124 along the axial direction A. Thus, retainer 150 may form a stop for pin 140 when retainer 150 is positioned within groove 124. When pin 140 and retainer 150 have a circular cross-section along the axial direction, a centerline diameter of retainer 150 is such that retainer 150 is received within groove 124 to provide a stop for pin 140.

As shown in FIG. 5, pin 140 may have a chamfered edge 146 at second end portion 144 of pin 140 and/or at an outer diameter of pin 140. Chamfered edge 146 of pin 140 may extend around pin 140 along the circumferential direction C at second end portion 144 of pin 140. Chamfered edge 146 of pin 140 may be positioned at or against retainer 150. Thus, pin 140 may engage retainer 150 at chamfered edge 146 of pin 140. When pin 140 is forced or urged against retainer 150, chamfered edge 146 may push retainer 150 outwardly along the radial direction R and/or further into groove 124. Thus, chamfered edge 146 of pin 140 may assist with retaining or securing pin 140 to first and second carrier plates 110, 120 with retainer 150 by limiting slipping or removal of retainer 150 from groove 124.

Planet carrier 100 may also include a needle roller bearing 160. Needle roller bearing 160 is positioned on pin 140, and planet gear 130 is positioned on needle roller bearing 160. Thus, planet gear 130 may be rotatable relative to pin 140 on needle roller bearing 160. Planet carrier 100 may further include a pair of thrust washers 162. One of thrust washers 162 is positioned at or against first carrier plate 110, and the other of thrust washers 162 may be positioned at or against second carrier plate 120. Planet gear 130 and needle roller bearing 160 may be positioned between thrust washers 162 along the axial direction A. Thrust washers 162 may limit or prevent rubbing of planet gear 130 and/or needle roller bearing 160 against first and second carrier plates 110, 120. Pin 140 extends through thrust washers 162 along the axial direction A. Planet gear 130, needle roller bearing 160 and thrust washers 162 are removable from first and second carrier plates 110, 120 by removing retainer 150 from second carrier plate 120 and sliding pin 140 from opening 122 of second carrier plate 120. Thus, retainer 150 can assist with servicing, repairing or replacing of planet gear 130, needle roller bearing 160 and/or thrust washers 162.

Figure 6:
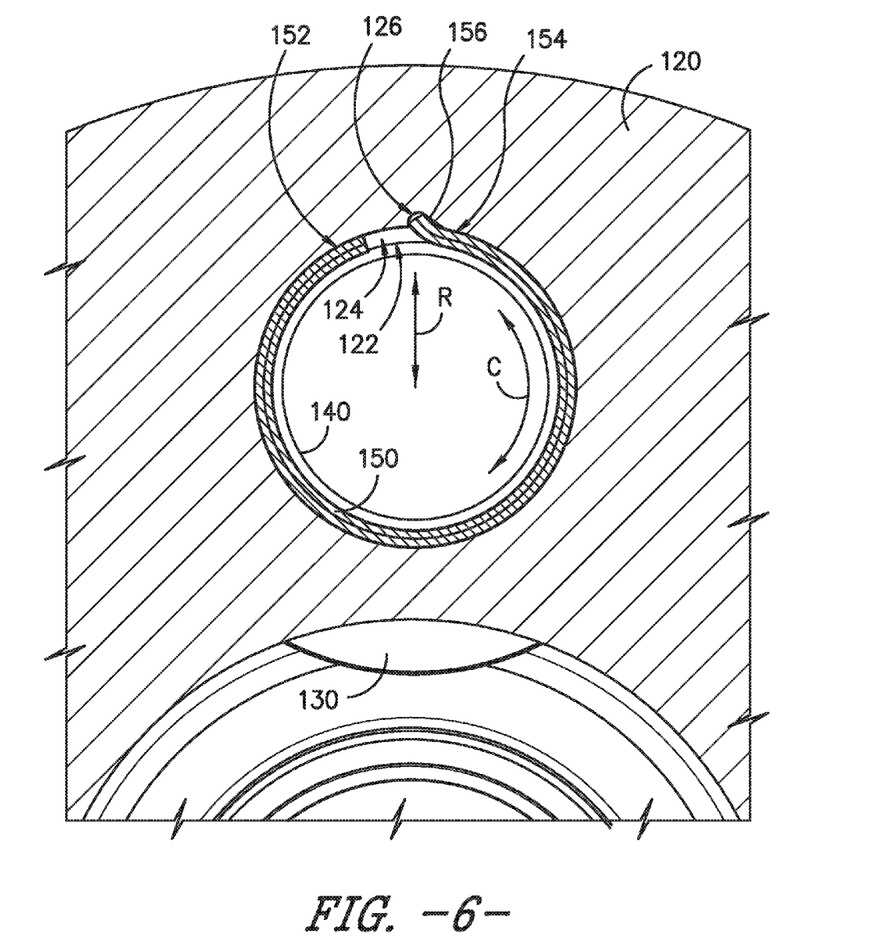
FIG. 6 provides a partial section, elevation view of a retainer and a second carrier plate of the exemplary planet carrier of FIG. 2.

FIG. 6 provides a partial section, elevation view of retainer 150 and second carrier plate 120. As may be seen in FIG. 6, retainer 150 may be a circlip in certain exemplary embodiments. Thus, retainer 150 may extend between a first end 152 and a second end 154 along the circumferential direction C. First end 152 of retainer 150 may be spaced from second end 154 of retainer 150 along the circumferential direction C and/or not contact second end 154 of retainer 150 in certain exemplary embodiments. Retainer 150 may have a tang 156 at the second end 154 of retainer 150. Tang 156 may extend outwardly along the radial direction R at or from second end 154 of retainer 150. Tang 156 may assist with orienting and positioning retainer 150 within second carrier plate 120 and may also facilitate removal of retainer 150 from second carrier plate 120, as discussed in greater detail below.

Second carrier plate 120 defines a notch or recess 126 that extends outwardly along the radial direction R from opening 122 of second carrier plate 120. For example, recess 126 may extend outwardly along the radial direction R from groove 124 of second carrier plate 120. Thus, recess 126 may extend into second carrier plate 120 along the radial direction R by more than groove 124. Tang 156 of retainer 150 may be received within recess 126 of second carrier plate 120. First end 152 of retainer 150 may be free within groove 124 of second carrier plate 120.

Positioning tang 156 within recess 126 may assist with properly orienting and positioning retainer 150 within second carrier plate 120. For example, recess 126 may be sized and oriented such that tang 156 is receivable within recess 126 in only one orientation of retainer 150 relative to second carrier plate 120. In addition, recess 126 may be sized to allow a tool to engage tang 156 when tang 156 is within recess 126. Thus, a technician may insert a tool, such as pliers, a pry bar, etc., into recess 126 and engage tang 156 to deform retainer 150 until retainer is able to be removed from groove 124. In such a manner, recess 126 of second carrier plate 120 and tang 156 of retainer 150 may assist with removable or detachable mounting of retainer 150 to second carrier plate 120. In addition, positioning tang 156 within recess 126 may limit or prevent rotation of retainer 150 relative to second carrier plate 120.

It will be understood that while retainer 150 is shown as a circlip in the exemplary embodiments shown in FIGS. 4 through 6, retainer 150 may be any other suitable retainer in alternative exemplary embodiments. For example, retainer 150 may be a spiral lock or a snap ring. Thus, retainer 150 may be an elastically deformable retainer to allow retainer 150 to be received within groove 124 of second carrier plate 120.

In addition to those described above, utilizing retainer 150 in planet carrier 100 may also have other benefits. For example, assembly time for planet carrier 100 may be reduced relative to conventional staked pins. As another example, pin 140 does not require annealing such as is required before or after staking a pin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A planet carrier for a planetary gear set, comprising:
   a first carrier plate defining an opening;
   a second carrier plate spaced from the first carrier plate along an axial direction, the second carrier plate defining an opening;
   a planet gear positioned between the first and second carrier plates along the axial direction;
   a pin extending between a first end portion and a second end portion along the axial direction, the first end portion of the pin positionable against the first carrier plate at the opening of the first carrier plate, the second end portion of the pin receivable within the opening of the second carrier plate, the pin extending through the planet gear between the first and second end portions of the pin such that the planet gear is rotatable relative to the first and second carrier plates on the pin and such that the pin is rotatable relative to the first and second carrier plates; and
   a retainer removably mounted to the second carrier plate at the opening of the second carrier plate, the second end portion of the pin positioned at the retainer such that the pin is disposed between the retainer and the first carrier plate along the axial direction when the retainer is mounted to the second carrier plate, the pin slidably removable from the opening of the second carrier plate when the retainer is removed from the second carrier plate.

2. The planet carrier of claim 1, wherein the second carrier plate defines a groove at the opening of the second carrier plate, the groove extending along a circumferential direction around the opening of the second carrier plate, the retainer received within the groove.

3. The planet carrier of claim 2, wherein the pin has a chamfered edge at the second end portion of the pin, the chamfered edge extending around the pin along the circumferential direction, the chamfered edge of the pin positioned at the retainer.

4. The planet carrier of claim 1, wherein the retainer is spaced from an end wall of the first carrier plate by a gap along the axial direction, the pin having a length along the axial direction, the length of the pin being less than the gap.

5. The planet carrier of claim 1, wherein the retainer is a circlip having a tang at one end of the circlip, the second carrier plate defining a recess that extends outwardly along a radial direction from the opening of the second carrier plate, the tang of the circlip received within the recess of the second carrier plate.

6. The planet carrier of claim 1, wherein the retainer is a spiral lock or a snap ring.

7. The planet carrier of claim 1, further comprising a needle roller bearing positioned on the pin, the planet gear positioned on the needle roller bearing such that the planet gear is rotatable relative to the pin.

8. The planet carrier of claim 7, further comprising a pair of thrust washers, one of the pair of thrust washers positioned against the first carrier plate and the other of the pair of thrust washers positioned against the second carrier plate, the planet gear and the needle roller bearing positioned between the pair of thrust washers along the axial direction, the pin extending through the pair of thrust washers along the axial direction.

9. The planet carrier of claim 8, wherein the planet gear, the needle roller bearing and the pair of thrust washers are removable from the first and second carrier plates by removing the retainer from the second carrier plate.

10. The planet carrier for a planetary gear set according to claim 9, wherein the pin is re-mountable to the second carrier plate after the planet gear, the needle roller bearing and the pair of thrust washers are removed from the first and second carrier plates.

11. An automatic transmission, comprising:
    a plurality of planetary gears connected to provide multiple transmission ratios between an input shaft and an output shaft, at least one of the plurality of planetary gear sets having a planet carrier that comprises
    a first carrier plate defining an opening;
    a second carrier plate also defining an opening;
    a planet gear positioned between the first and second carrier plates along the axial direction;
    a pin extending between a first end portion and a second end portion along the axial direction, the first end portion of the pin positioned against the first carrier plate at the opening of the first carrier plate, the second end portion of the pin received within the opening of the second carrier plate, the pin extending through the planet gear between the first and second end portions of the pin such that the planet gear is rotatable relative to the first and second carrier plates on the pin and such that the pin is rotatable relative to the first and second carrier plates; and a retainer removably mounted to the second carrier plate at the opening of the second carrier plate, the second end portion of the pin positioned at the retainer such that the pin is disposed between the retainer and the first carrier plate along the axial direction when the retainer is mounted to the second carrier plate, the pin slidably removable from the opening of the second carrier plate when the retainer is removed from the second carrier plate.

12. The automatic transmission of claim 11, wherein the second carrier plate defines a groove at the opening of the second carrier plate, the groove extending along a circumferential direction around the opening of the second carrier plate, the retainer received within the groove.

13. The automatic transmission of claim 12, wherein the pin has a chamfered edge at the second end portion of the pin, the chamfered edge extending around the pin along the circumferential direction, the chamfered edge of the pin positioned at the retainer.

14. The automatic transmission of claim 11, wherein the retainer is spaced from an end wall of the first carrier plate by a gap along the axial direction, the pin having a length along the axial direction, the length of the pin being less than the gap.

15. The automatic transmission of claim 11, wherein the retainer is a circlip having a tang at one end of the circlip, the second carrier plate defining a recess that extends outwardly along a radial direction from the opening of the second carrier plate, the tang of the circlip received within the recess of the second carrier plate.

16. The automatic transmission of claim 11, wherein the retainer is a spiral lock or a snap ring.

17. The automatic transmission of claim 11, further comprising a needle roller bearing positioned on the pin, the planet gear positioned on the needle roller bearing such that the planet gear is rotatable relative to the pin.

18. The automatic transmission of claim 17, further comprising a pair of thrust washers, one of the pair of thrust washers positioned against the first carrier plate and the other of the pair of thrust washers positioned against the second carrier plate, the planet gear and the needle roller bearing positioned between the pair of thrust washers along the axial direction, the pin extending through the pair of thrust washers along the axial direction, wherein the planet gear, the needle roller bearing and the pair of thrust washers are removable from the first and second carrier plates by removing the retainer from the second carrier plate.

19. A planet carrier for a planetary gear set, comprising:
a pair of carrier plates;
a planet gear positioned between the carrier plates of the pair of carrier plates;
a pin extending between the carrier plates of the pair of carrier plates through the planet gear such that the planet gear is rotatable relative to the carrier plates of the pair of carrier plates on the pin; and
an elastically deformable retainer removably mounted to one of the pair of carrier plates, the pin positioned against the elastically deformable retainer at the one of the pair of carrier plates when the retainer is mounted to the one of the pair of carrier plates, the pin being removable from between the carrier plates of the pair of carrier plates when the retainer is removed from the one of the pair of carrier plates,
wherein the pin is rotatable relative to the carrier plates of the carrier plates.

\* \* \* \* \*